US011669599B2

(12) United States Patent
Singri et al.

(10) Patent No.: US 11,669,599 B2
(45) Date of Patent: Jun. 6, 2023

(54) SYSTEMS AND METHODS FOR SOFTWARE LICENSE MANAGEMENT

(71) Applicant: ServiceNow, Inc., Santa Clara, CA (US)

(72) Inventors: Medha Singri, Santa Clara, CA (US); Colby Andrew Blakeman, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 609 days.

(21) Appl. No.: 16/200,231

(22) Filed: Nov. 26, 2018

(65) Prior Publication Data
US 2020/0167444 A1 May 28, 2020

(51) Int. Cl.
G06F 21/10 (2013.01)
G06F 8/65 (2018.01)
G06F 8/71 (2018.01)
G06F 8/61 (2018.01)

(52) U.S. Cl.
CPC .............. G06F 21/105 (2013.01); G06F 8/62 (2013.01); G06F 8/65 (2013.01); G06F 8/71 (2013.01); G06F 2221/0775 (2013.01)

(58) Field of Classification Search
CPC . G06F 21/105; G06F 8/62; G06F 8/65; G06F 8/71; G06F 2221/0775
See application file for complete search history.

(56) References Cited

U.S. PATENT DOCUMENTS 6,321,229 B1  11/2001  Goldman
6,799,189 B2   9/2004  Huxoll
6,816,898 B1  11/2004  Scarpelli
6,895,586 B1   5/2005  Brasher
(Continued)

FOREIGN PATENT DOCUMENTS

TW  201227508  *  7/2012  ............... G06F 9/44

OTHER PUBLICATIONS

Compare Windows 10 Professional, Enterprise & Education Editions, Mar. 17, 2017, Microsoft, pp. 1-10 (Year: 2017).*

(Continued)

Primary Examiner — Neha Patel
Assistant Examiner — Nilesh B Khatri
(74) Attorney, Agent, or Firm — Fletcher Yoder PC

(57) ABSTRACT

In accordance with the present approach, an edition-managing software application may be provided to query registries of client devices for edition information associated with a target software package. When retrieved, the edition information may then be stored in a universal storage location from which the edition-managing software application may generate an edition report that provides an accurate representation of actual installations of each edition of the target software package on the client devices. Further, in accordance with the present approach, a usage-tracking software program may be provided to retrieve a last used date of a target software package on client devices. If the last used date is beyond a threshold time period for the client devices, the enterprise may determine that the target software package is underutilized compared to a desired usage. Then, the target software package may be uninstalled from the client devices and installed on other client devices.

20 Claims, 9 Drawing Sheets

(56) References Cited

U.S. PATENT DOCUMENTS

| | | |
|---|---|---|
| 7,020,706 B2 | 3/2006 | Cates |
| 7,027,411 B1 | 4/2006 | Pulsipher |
| 7,350,209 B2 | 3/2008 | Shum |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidar |
| 7,933,927 B2 | 4/2011 | Dee |
| 7,945,860 B2 | 5/2011 | Vambenepe |
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 9,015,188 B2 | 4/2015 | Behne |
| 9,065,783 B2 | 6/2015 | Ding |
| 9,081,747 B1* | 7/2015 | Tabieros .................. G06F 8/60 |
| 9,098,322 B2 | 8/2015 | Apte |
| 9,037,115 B2 | 9/2015 | Mayfield |
| 9,122,552 B2 | 9/2015 | Whitney |
| 9,137,115 B2 | 9/2015 | Mayfield |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,822 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2002/0004815 A1* | 1/2002 | Muhlestein ............... G06F 9/46 709/201 |
| 2002/0026605 A1* | 2/2002 | Terry .................... G06F 21/552 714/37 |
| 2002/0124245 A1* | 9/2002 | Maddux .................... G06F 8/60 717/176 |
| 2003/0131046 A1* | 7/2003 | Asano ...................... G06F 8/62 709/201 |
| 2006/0064474 A1* | 3/2006 | Feinleib ................... G06F 8/63 709/220 |
| 2006/0294320 A1* | 12/2006 | Yallapragada ........ G06F 12/109 711/147 |
| 2008/0220759 A1* | 9/2008 | Norrman ................. H04W 8/22 455/419 |
| 2010/0070965 A1* | 3/2010 | Britten ..................... G06F 8/65 717/173 |
| 2010/0198843 A1* | 8/2010 | Sirota ...................... G06F 8/60 707/754 |
| 2012/0084393 A1* | 4/2012 | Williams ................. G06F 8/61 709/224 |
| 2013/0024388 A1* | 1/2013 | Kolb ..................... G06Q 30/02 705/317 |
| 2013/0219513 A1* | 8/2013 | Suzuki .................... G06F 21/10 726/27 |
| 2016/0134616 A1* | 5/2016 | Koushik ................. H04L 63/08 726/9 |
| 2016/0196124 A1* | 7/2016 | Vedula ..................... G06F 8/60 717/177 |
| 2016/0321437 A1* | 11/2016 | Kimmell ................. H04L 67/42 |
| 2016/0381031 A1* | 12/2016 | McMichael, IV .... H04L 63/102 726/6 |
| 2017/0270284 A1* | 9/2017 | Sreesha ................. G06F 21/105 |
| 2017/0286711 A1* | 10/2017 | Negrea ................. G06F 21/6218 |
| 2018/0144108 A1* | 5/2018 | Sawai ................... G06Q 10/087 |
| 2018/0246710 A1* | 8/2018 | Kim .................... G06F 9/45558 |

OTHER PUBLICATIONS

Rufus Credle et al., Simplify Software Audits and Cut Costs by Using the IBM License Metric Tool, Sep. 17, 2014, IBM Redpaper, pp. 1-100 (Year: 2014).*

* cited by examiner

DATA SOURCES
SCCM 2012 V2 USAGE-TRACKING — 450

| Field | Value |
|---|---|
| *NAME | SCCM 2012 V2 USAGE-TRACKING |
| IMPORT SET TABLE LABEL | SCCM 2012 V2 USAGE-TRACKING |
| *IMPORT SET TABLE NAME | imp_sccm2012v2_usage_tracking |
| TYPE | JDBC |
| USE MID SERVER | mid_on_27 — 456 |
| FORMAT | SQL SERVER |
| INSTANCE NAME | |
| DATABASE NAME | CM_P02 |
| DATABASE PORT | |
| APPLICATION | GLOBAL |
| USE INTEGRATED AUTHENTICATION | ☐ |
| USERNAME | SQLSERVICE1 — 460 |
| PASSWORD | ********** — 460 |
| SERVER | SAMLABVM03 |
| QUERY | SPECIFIC SQL — 454 |
| QUERY TIMEOUT | 0 |
| CONNECTION TIMEOUT | 0 |
| *SQL STATEMENT — 452 | /*TABLE NAME AND THE QUERY BELOW SHOULD NOT BE CONSIDERED AS THE FINAL QUERY THAT EXECUTES. THE FINAL TABLE AND QUERY RESPONSIBLE FOR EXTRACTING DATA FROM SCCM IS FORMED AT RUN-TIME*/ |
| USE LAST RUN DATETIME | ☑ |
| LAST RUN DATETIME | '2018-09-26 19:52:51.0' |
| *LAST RUN DATABASE FIELD | TIMESTAMP |

UPDATE  DELETE
RELATED LINKS
TEST LOAD 20 RECORDS
LOAD ALL RECORDS

TRANSFORMS | NEW | SEARCH | ORDER ▶ | SEARCH

*FIG. 8*

```sql
SELECT *
FROM [CM_P02].[dbo].[v_GS_CCM_RECENTLY_USED_APPS]
order by ExplorerFileName0
```

| | ExplorerFileName() | FileDescription() | FileSize() | FileVersion() | FolderPath() | LastUsedDate() |
|---|---|---|---|---|---|---|
| 1 | 57.0.2987.133_chrome_installe... | GOOGLE CHROM INSTALLER | 46867048 | 57.0.2987.133 | C:\Program Files(x86)\Google... | 2018-04-06 23:55:05 |
| 2 | 68.0.3440.84_chrome_installer... | GOOGLE CHROM INSTALLER | 50470504 | 68.0.3440.84 | C:\Program Files(x86)\Google... | 2018-04-09 22:55:05 |
| 3 | 7z1805x64.exe | 7-ZIP INSTALLER | 1438086 | 18.05 | C:\Users\samadmin\Downloa... | 2018-04-09 23:45:05 |
| 4 | 7zG.exe | 7-ZIP GUI | 576000 | 18.05 | C:\Program Files\7-Zip\ | 2018-04-15 01:25:15 |
| 5 | AAM Updates Notifier.exe | AAM UPDATES NOTIFIER AP... | 1026240 | 9.0.0.281 | C:\Program Files(x86)\Comm... | 2018-05-03 8:14:10 |
| 6 | AAM Updates Notifier.exe | AAM UPDATES NOTIFIER AP... | 1026240 | 9.0.0.281 | C:\Program Files(x86)\Comm... | 2018-05-03 9:58:33 |
| 7 | Acrobat_sl.exe | ADOBE ACROBAT SPEED LA... | 51280 | 15.23.20053.211670 | C:\Program Files(x86)\Adobe\... | 2018-06-05 11:09:14 |
| 8 | Acrobat_sl.exe | ADOBE ACROBAT SPEED LA... | 51280 | 15.23.20053.211670 | C:\Program Files(x86)\Adobe\... | 2018-06-05 13:22:04 |
| 9 | Acrobat_sl.exe | ADOBE ACROBAT SPEED LA... | 51280 | 15.23.20053.211670 | C:\Program Files(x86)\Adobe\... | 2018-06-06 16:55:06 |
| 10 | Acrobat_sl.exe | ADOBE ACROBAT SPEED LA... | 50256 | 15.6.30279.21677 | C:\Program Files(x86)\Adobe\... | 2018-06-10 5:55:45 |
| 11 | AcroCEF.exe | ADOBE ACROCEF | 12581872 | 18.11.20036.265267 | C:\Program Files(x86)\Adobe\... | 2018-06-10 7:15:07 |
| 12 | AcroDist.exe | ACROBAT DISTILLER | 480848 | 15.23.20053.211670 | C:\Program Files(x86)\Adobe\... | 2018-06-11 06:02:13 |
| 13 | AcroDist.exe | ACROBAT DISTILLER | 480848 | 15.23.20053.211670 | C:\Program Files(x86)\Adobe\... | 2018-06-15 9:22:26 |
| 14 | AcroDist.exe | ACROBAT DISTILLER | 480848 | 15.23.20053.211670 | C:\Program Files(x86)\Adobe\... | 2018-06-15 11:08:21 |
| 15 | AcroDist.exe | ACROBAT DISTILLER | 480848 | 15.23.20053.211670 | C:\Program Files(x86)\Adobe\... | 2018-06-15 14:18:39 |
| 16 | AcroDist.exe | ACROBAT DISTILLER | 480848 | 15.6.30279.211677 | C:\Program Files(x86)\Adobe\... | 2018-07-07 7:18:24 |
| 17 | AcroDist.exe | ACROBAT DISTILLER | 480848 | 15.23.20053.211670 | C:\Program Files(x86)\Adobe\... | 2018-07-09 23:29:34 |

*FIG. 9*

| SOFTWARE USAGES | NEW | SEARCH | USER | ▽ | SEARCH | | ▼▼ ▼ | 1 | TO 4 OF 4 ▲ ▲▲ |
|---|---|---|---|---|---|---|---|---|---|

| | USER | SOFTWARE PUBLISHER | SOFTWARE PACKAGE | CLIENT DEVICE | LAST USED DATE | LAST USED DATE | RECLAMATION TYPE |
|---|---|---|---|---|---|---|---|
| ☐ ⊖ | SAMADMIN | PUBLISHER C | SOFTWARE A | SAMLABVM18 | 2018-04-06 23:55:05 | LAST USED DATE | |
| ☐ ⊖ | SAMADMIN | PUBLISHER D | SOFTWARE B | SAMLABVM15 | 2018-04-09 22:31:10 | LAST USED DATE | |
| ☐ ⊖ | SAMADMIN | PUBLISHER C | SOFTWARE A | SAMLABVM10 | 2018-06-29 01:17:15 | LAST USED DATE | |
| ☐ ⊖ | SAMADMIN | PUBLISHER D | SOFTWARE B | SAMLABVM18 | 2018-06-30 04:54:03 | LAST USED DATE | |

*FIG. 10*

SYSTEMS AND METHODS FOR SOFTWARE LICENSE MANAGEMENT

BACKGROUND

The present disclosure relates generally to tracking and managing software license usage for client devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

As part of performing these core functions, certain enterprise and other organization users may purchase software licenses from software publishers to gain permission to use proprietary software applications on their end-user or client devices. For organizations having a large number of personnel, managing the acquisition and maintenance of appropriate software licenses for even a few software applications may represent a significant undertaking. Indeed, because many organizations utilize a collection of various proprietary software applications, which may come in numerous editions and versions, ensuring software license compliance year-round, and particularly during periodic audits by software publishers, may be difficult to realize in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One consideration for managing software licenses relates to identifying editions of software packages installed on client devices. That is, a respective software package may be available in multiple editions (e.g., Professional, Standard, Education), which are each associated with a respective set of features and a corresponding, purchasable software license that is particular to the edition of the software package. Further, software publishers may store edition information for their respective software applications in unique or individualized, non-standardized locations, which may prevent system management software programs from retrieving edition information for the software packages. As such, during audits by software publishers, an enterprise may not readily know whether an appropriate amount of software licenses are purchased for each edition of their software packages, leading to under-licensing or over-licensing compared to actual deployment of the software packages by the enterprise.

To enhance an enterprise's ability to manage software licenses for its users, the systems and methods disclosed herein include an edition-managing software application (e.g., powershell script) that is installable on client devices to collect edition information for selected software (e.g., software packages, software applications). The powershell script includes one or multiple modules and/or commandlets that are each adapted for retrieving edition information for an individual software package. A system management software program (e.g., Microsoft® System Center Configuration Manager (SCCM)) may run the powershell script on a local server (e.g., a management, instrumentation, and discovery (MID) server) in contact with multiple client devices to query publisher-specific locations in device registries of client devices. The system management software program retrieves the edition information for the selected software package and stores the edition information for each software package in a respective universal edition storage location entry, such a Windows Management Instrumentation (WMI) class entry, in a registry. Then, the system management software program may generate an edition report based on the entries in the registry that include the currently-installed software packages and their respective editions.

Another consideration regarding software licenses relates to monitoring usage of the software packages to determine whether the software package is sufficiently utilized by end-users. For example, if one end-user is not utilizing a software package or does so only rarely, the enterprise may desire to uninstall the software package on the one end-user's device so that an associated software license for the software package may be distributed to another end-user instead. Although the system management software program may traditionally employ software metering to determine a total usage time and a total access count of the software applications for each end-user, such detailed reporting generates a significant amount of information that may utilize significant resources and storage space to analyze and store. For example, if one user launches a software application once a day on four machines, 120 entries may be generated each month by the one user. Extending this scenario to a medium-size company having, for example, 100,000 machines and 25,000 users, many billion entries may be generated over each month, thus presenting a significant data management challenge.

As such, the systems and methods disclosed herein further include features to fetch a last used date of software packages installed on the client devices, instead of complete usage data, thereby significantly reducing processing and storage demands for tracking usage of the software packages. By connecting to the MID server or local server, a system management software program, such as the SCCM introduced above, may retrieve a last used date for the identified software package and store the last used date as entries in a database. By comparing the last used date to a threshold last used date, the system management software program may determine whether each user is sufficiently utilizing the software packages licensed to them. Thus, the system management software program may identify underutilization of software packages that are not accessed within a threshold time period and uninstall the underutilized software packages from the associated client devices to make software licenses available for other end-users to utilize. In these manners and more, the system management software program enables improved license reporting and distribution for any suitable groups of users, such as enterprises, individuals, and so forth.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 8 is a screenshot of an embodiment of a usage-tracking software program parameterized to retrieve last used date information from a local server in contact with multiple client devices, in accordance with aspects of the present disclosure;

FIG. 9 is a screenshot of an embodiment of a database stored on a local server and populated with last used date information for the target software packages, in accordance with aspects of the present disclosure; and FIG. 10 is a screenshot of an embodiment of last used date report of the target software packages, in accordance with aspects of the present disclosure.

DETAILED DESCRIPTION

Figure 1:
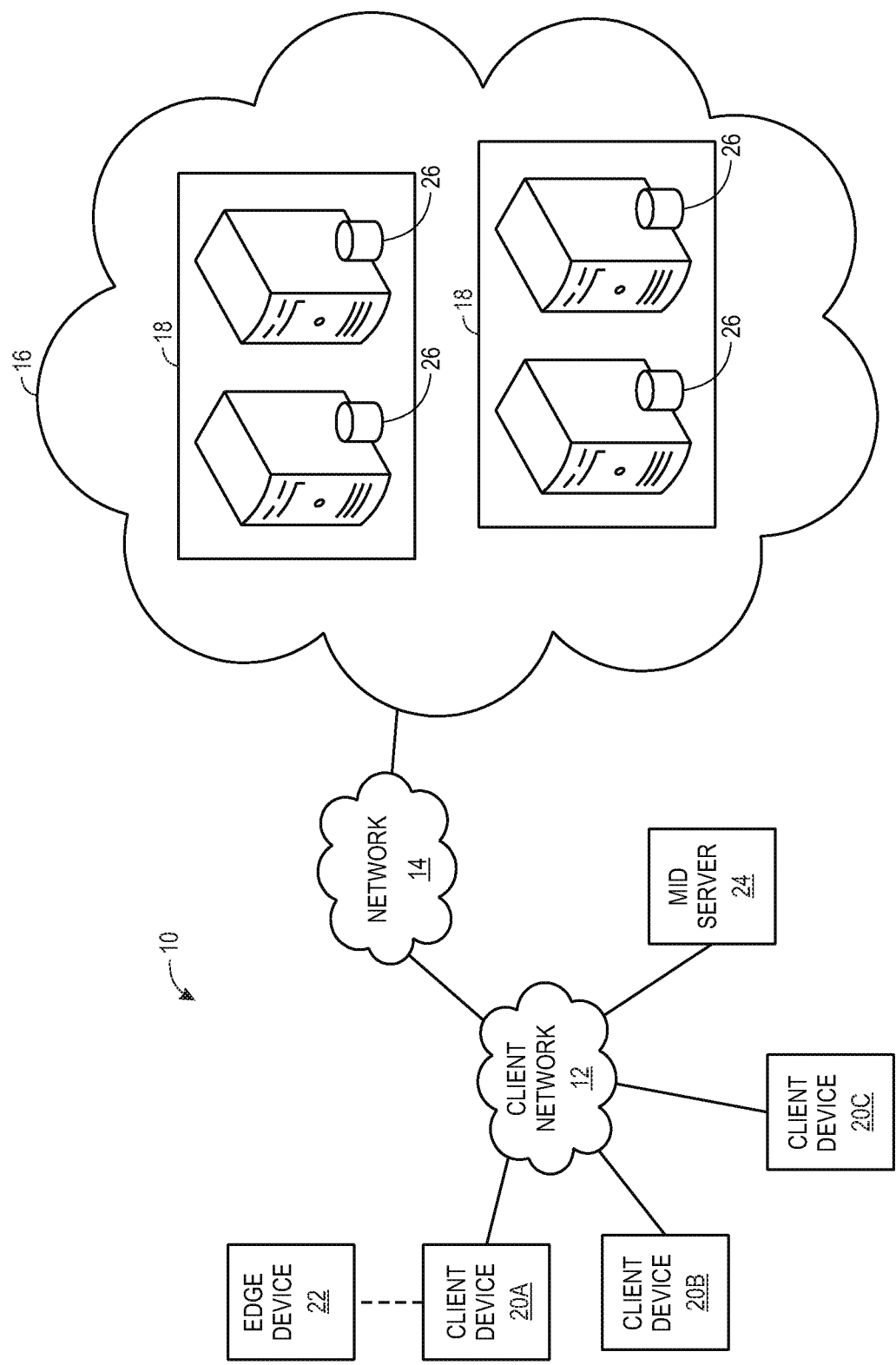
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Furthermore, as used herein, the term "version" refers to a respective build or build file associated with a given software program or software application installable on client devices of an enterprise network. The version of a software program may be denoted by a numeric representation that corresponds to changes or developments made to a software application, such as 1.0, 2.0, 2.05, 8.50.3, and so forth. As used herein, the term "edition" refers to the bundling, packaging, or selling of a respective software package for different experiences or degrees of completeness. As such, it is to be understood that a respective version of a software package may be available in multiple editions that each are targeted to a different segments of end-users, and that the version of a software application of a particular software package is distinct from or independent of an edition of the particular software package. Some examples of editions include standard, professional, home, education, enterprise, and so forth. Moreover, respective software licenses that accompany various software packages may differ in pricing for different editions, such that higher-end or more complete editions of a respective software package are more expensive than lower-end or less complete editions of the same software package.

As discussed herein, an enterprise or other client may use certain software packages that are installed on client devices directly, that is, independently of any cloud-provided services. To provide users with a desired set of features, the software packages may be provided to each user in a particular edition. As such, across the enterprise, a significant variance in installed editions of software packages, which are each to be paired with a corresponding software license, may exist.

During an audit by a software publisher of a particular software package, the software publisher may request evidence that the enterprise has a software license for each installation of the particular software package. Because edition information may be inaccessible to a traditional system management software program, verifying compliance with an audit request may be a time and/or resource heavy endeavor. For example, one or multiple users may be in charge of manually verifying which edition of the software package is provided to each client device. Alternatively, if the traditional system management software determines that a certain number of installations of the particular software package are present within an enterprise, without indication of the edition of each installation of the particular software package, the enterprise may be required to purchase a corresponding number of software licenses for a top-tier edition of the particular software package. These practices may result in a waste of previously purchased and lower-cost licenses for lower-tier editions of the particular software package on the client devices. Accordingly, it is now appreciated that there is a need for improved edition monitoring of software packages installed on client devices in an enterprise to ensure and improve audit compliance. As discussed herein, desired improvements are provided by an edition-managing software application to retrieve or fetch edition information and populate an edition report with the retrieved edition information.

Moreover, some users may be provided with software packages, or particular editions thereof, that the users are underutilizing. As such, should additional users desire to use the software package, the enterprise generally purchases software licenses for the additional users, adding to an operating cost for provisioning the users with software packages for performing enterprise tasks. In other cases, to make a software license available for a user requesting to use the software package, the enterprise may erroneously uninstall the software package from a client device of a user who was utilizing the software application. Further, traditional software metering available to the enterprise may generate copious amounts of comprehensive data that is expensive to store and/or difficult to analyze. Accordingly, it is also now appreciated that there is a need for improved software metering for enabling an enterprise to efficiently distribute software licenses to users of particular software packages. Such desired management is facilitated by a usage-tracking software program that retrieves a last used date of software packages, as discussed herein.

With the preceding in mind, the following figures relate to various types of generalized system architectures or configurations that may be employed to provide services to an organization in a multi-tenant or multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
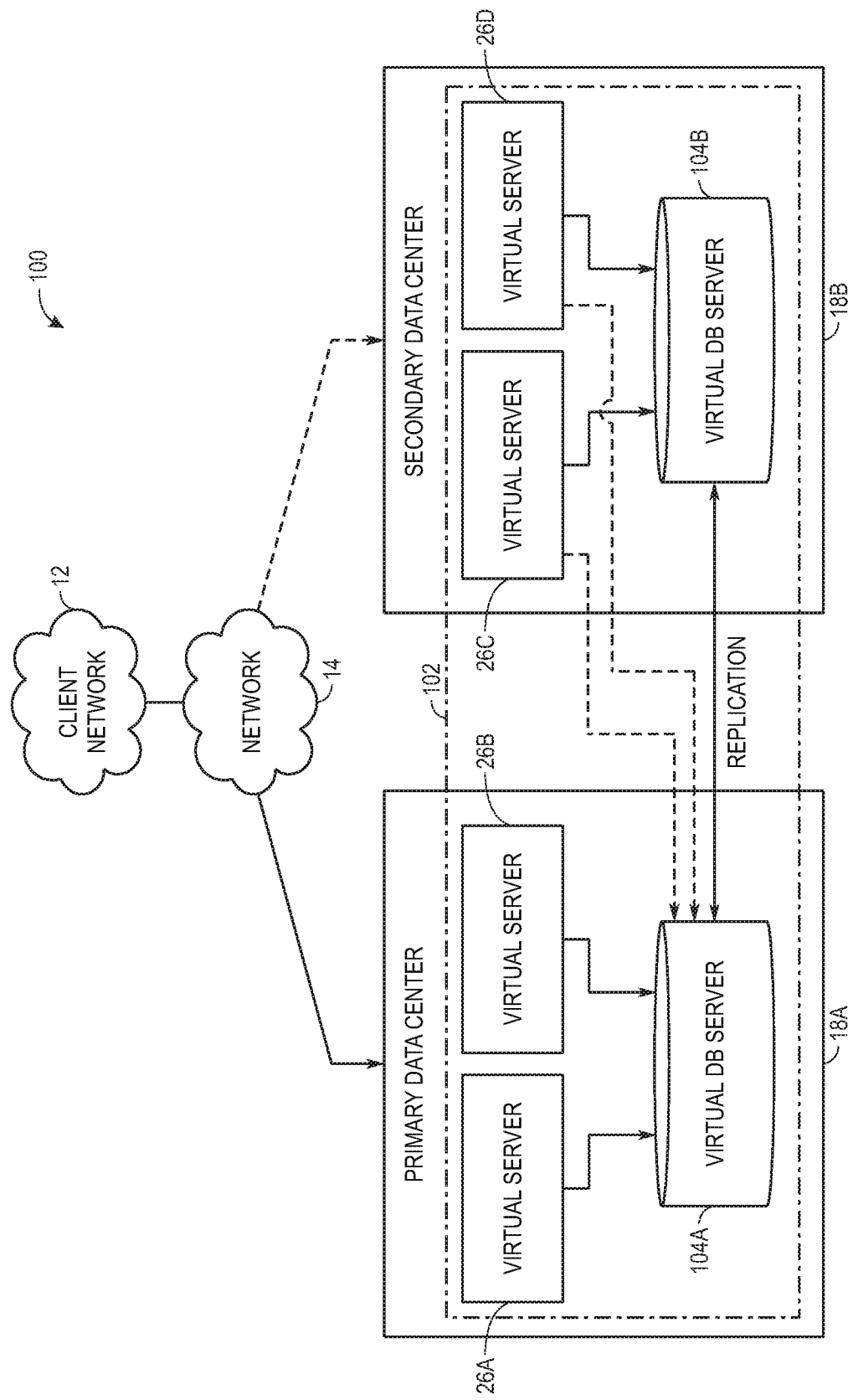
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
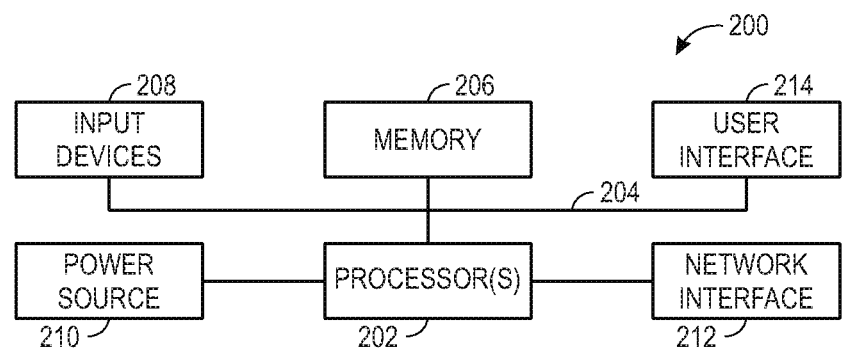
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
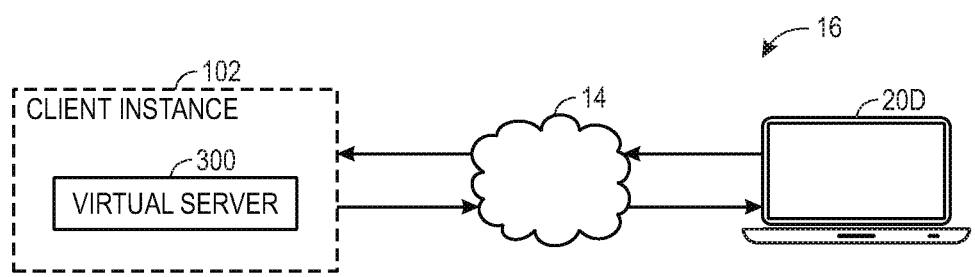
FIG. 4 is a block diagram illustrating an embodiment in which a virtual server supports and enables the client instance, in accordance with aspects of the present disclosure.

With the foregoing in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to cloud-based applications executing within the client instance 102 (e.g., via a web browser of the client device 20D). Client instance 102 is supported by virtual servers 26 similar to those explained with respect to FIG. 2, and is illustrated here to show support for the disclosed edition tracking and license usage monitoring functionality described herein in the context of the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

To enable end-users to perform certain enterprise tasks on their client devices 20, software packages may be installed directly on the client devices 20, separate or independent from the cloud-based platform 16. As used herein, a "software package" is a collection or grouping of files, often including an executable file, that are packaged together to enable installation, operation, and maintenance of a software program or application on a client device 20. By way of non-limiting example, the software packages may include word-processing software packages, report-generating software packages, modeling software packages, communication software packages, web-browsing software packages, and/or any other software packages by which the end-users may perform work. The enterprise may readily know which services and software features the end-users receive through the cloud-based platform 16, but monitoring usage of the installed software packages on client devices 20 to enable an appropriate set of software licenses to be purchased may provide a challenge. To ensure an appropriate amount of software licenses are acquired or maintained for each installation of each edition of the software packages, the present techniques include an edition-managing software application that may be implemented locally on the client network 12 or remotely on the cloud-based platform 16 (e.g., as an IT service) to collect and provide edition information for the software packages.

Figure 5:
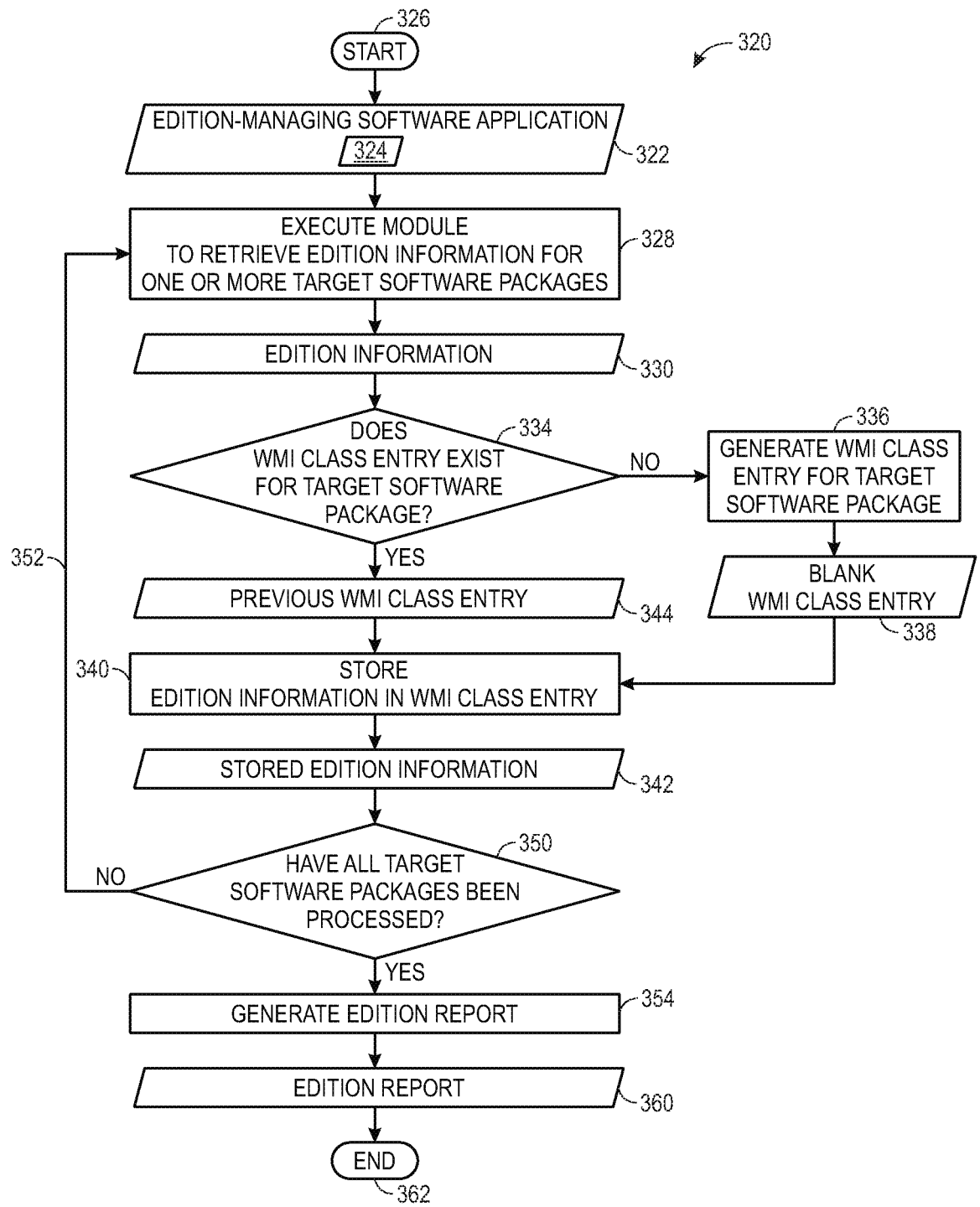
FIG. 5 is a flow diagram of an embodiment of a process for generating an edition report for targeted software packages via an edition-managing software application, in accordance with aspects of the present disclosure.

With the preceding in mind, FIG. 5 is a flow diagram of an embodiment of a process 320 depicting use of an edition-managing software application 322 to retrieve edition information for various software packages installed on client devices 20 and subsequently generate an edition report, in accordance with aspects of the present disclosure. The steps illustrated in the process 320 are meant to facilitate discussion and are not intended to limit the scope of this disclosure, because additional steps may be performed, certain steps may be omitted, and the illustrated steps may be performed in an alternative order or in parallel, where appropriate. The steps illustrated in the process 320 may be performed by the edition-managing software application 322 that is implemented by a system management software program, such as Microsoft® System Center Configuration Manager (SCCM). The system management software program may implement the edition-managing software application 322 locally on client devices 20 or remotely through the cloud-based platform 16 to monitor multiple client devices 20 for the purpose of identifying editions of selected or targeted software packages installed on the client devices 20. That is, for license compliance, a particular subset or collection of software packages may be identified as significant for monitoring editions thereof, and thus be denoted as targeted software packages or software packages of interest. For example, an enterprise may determine that edition information is to be acquired for software package A and software package B, although it is to be understood that edition information for any suitable number of software packages may be acquired and managed by the techniques disclosed herein.

As mentioned above, software publishers may store edition information related to their particular software packages in publisher-specified locations within registries or other operating system components of client devices 20. Because the publisher-specified locations may vary between different software publishers, the presently disclosed process 320 utilizes the edition-managing software application 322 that is parameterized to search or query these publisher-specified locations for edition information of the target software packages. For this purpose, in some embodiments, the edition-managing software application 322 includes modules 324 that are each coded or programmed to query a particular registry position for edition information of a respective software package. For example, in embodiments in which edition information for software package A and software package B is requested, a service provider may generate and combine a first module 324 specific to software A and a second module 324 specific to software B to configure or enhance the edition-managing software application 322. The edition-managing software application 322 may be any suitable code, script, powershell script, command, commandlet, or so forth that is executable on the client network 12, the network 14, the cloud-based platform 16, and/or the client devices 20 for performing the steps discussed herein.

Further, to provide the edition-managing software application 322 access to the publisher-specified locations in registries for the target software packages, the edition-managing software application 322 is installed on or pushed down into each client device 20 from which collecting edition information is desired. The edition-managing software application 322 may therefore be executed locally on each client device 20 in some embodiments to manage edition information, as discussed herein with reference to process 320. In other embodiments, all or part of the edition-managing software application 322 is executed by the system management software program on the MID server 24 to manage edition information from multiple client devices 20 coupled to the MID server 24.

In the depicted example, the process 320 for managing edition information starts (block 326) by executing (block 328) module 324 of the edition-managing software application 322 configured to retrieve edition information for one or more target software packages. The edition-managing software application 322 may execute module 324 to query publisher-specified locations in the registries of the client device 20 for edition information of one or more software packages of interest. Such queries performed by the module 324 may be performed sequentially and iterated until all software packages of interest have been searched or may be performed in parallel as system resources permit. The edition-managing software application 322 therefore retrieves edition information 330 that includes data indicative of the edition of software packages of interest. For example, the edition information 330 may include a name of the edition (e.g., standard, professional, home), a code indicative of the edition (e.g., a combination of alpha numerals), or any other suitable data from which the edition-managing software application 322 is able to determine the edition of a respective software package. In cases in which the target software package is not installed on the client device 20, the edition-managing software application 322 may generate an indication that the target software package is not installed or may store a zero or another negative or null indicator as the edition information 330 for the target software package of the client device 20.

The edition-managing software application 322 stores the edition information 330 in a universal or accessible storage location within the registries of the client device 20 to enable efficient updating and generation of edition reports. As such, once the edition information 330 is retrieved, the edition-managing software application 322 may determine (block 334) whether a Windows Management Instrumentation (WMI) class entry exists for the target software package. The WMI class may be a constructed object having defined properties within the registries or operating system files of the client device 20, and in which entries for the edition information 330 may be generated on demand. In other embodiments, the edition-managing software application 322 may manage the edition information 330 by storing the edition information 330 in any other suitable storage location within the client device 20 from which it can be easily retrieved for subsequent use or reference. Further, in some embodiments, the determination of block 334 may be performed in parallel with or before retrieval of the edition information 330 performed at block 328.

In response to determining that a WMI class entry does not exist for the target software package, the edition-managing software application 322 generates (block 336) a WMI class entry for the target software package. Thus, a blank WMI class entry 338 is generated within the registries of the client device 20. For example, the edition-managing software application 322 may generate a blank WMI class entry 338 specifically for a target software application within the registries of the client device 20 if such a registry entry does not exist. The edition-managing software application 322 may proceed to store (block 340) the edition information 330 for the target software package within the blank WMI class entry 338, generating stored edition information 342 that may be more efficiently accessed during subsequent steps of the process 320.

Alternatively, in response to determining that a WMI class entry exists for the target software package, the edition-managing software application 322 identifies a previous WMI class entry 344 for the target software package. In some embodiments, the previous WMI class entry 344 may have been generated during a previous execution of the process 320. Thus, the edition-managing software application 322 may proceed to store (block 340) the newly retrieved edition information 330 in the previously created WMI class entry 344 to generate the stored edition information 342. In some embodiments, the edition-managing software application 322 may overwrite any previous edition information that was stored in the previous WMI class entry 344 with the current edition information 330. In some embodiments, the edition-managing software application 322 may maintain a historic log having the edition information 330 in combination with any previously determined edition information of the target software package. Maintaining a log of previous edition information is beneficial in some embodiments to enable the enterprise to identify changes or updates in the edition of the target software packages installed on the client device 20 over time.

With the edition information 330 for the target software package retrieved and stored as the stored edition information 342, the edition-managing software application 322 following the illustrated embodiment of the process 320 determines (block 350) whether all software packages of interest have been processed. For the depicted example, in response to determining at block 350 that additional software packages are to be processed, the edition-managing software application 322 returns, as indicated by arrow 352, to process the next target software package for which edition information is needed. For example, the edition-managing software application 322 may retrieve the edition information 330 of software package A, and proceed through blocks 334, 336, and/or 340 as appropriate and as discussed above to generate the stored edition information 342 for software package B. The edition-managing software application 322 therefore continues to return to block 328 until each software package of interest has been processed.

In response to determining at block 350 that each software package of interest has had edition information 330 ascertained and stored, the edition-managing software application 322 generates (block 354) an edition report 360 that details or provides information indicative of the respective edition of each target software package installed on the client device 20. The edition-managing software application 322 retrieves the stored edition information 342 from the respective WMI class entries and consolidates the stored edition information 342 into the edition report 360. By maintaining the stored edition information 342 in the WMI class entries, the edition-managing software application 322 may more efficiently retrieve the edition information 330 compared to situations in which the edition information 330 is not in a standardized location. In embodiments in which the stored edition information 342 includes coded edition information or coded data representative of the edition of a target software package, the edition-managing software application 322 may convert the coded data into a readily-recognized or decoded edition identifier before including the stored edition information 342 in the edition report 360. The edition report 360 may be any suitable list, table, database, or arrangement of data that enables a user efficiently determine which edition of the target software package is installed on the client device 20. The edition report 360 may be provided or transmitted to the end-user of the client device 20, to a manager of the client network 12, to a manager of the cloud-based platform 16, and/or any other suitable personnel or management software applications. Thus, based on the accurate information presented therein, the edition report 360 signals an end (block 362) of the process 320 that enables accurate distribution and purchasing of software licenses for the actual installations of the target client software applications on the client device 20, which improves audit compliance.

The process 320 may be repeated as desired, such as on a scheduled or periodic basis, upon user request, upon notice of an audit by a software publisher, and so forth. Moreover, although discussed with reference to one client device 20, it is to be understood that the techniques of process 320 may be extended to provide individual edition report 360 for a number of client devices 20, such as for each workstation on a client network. In further embodiments, the edition-managing software application 322 may alternatively provide a single edition report 360 detailing the edition information 330 for a plurality of client devices 20, such as described below with reference to FIG. 6. In these embodiments, the edition information 330 may be retrieved for each target software package of each client device 20 and consolidated into a single table or other data representation that is categorized or organized with respect to the target software packages and the client devices 20.

Figure 6:
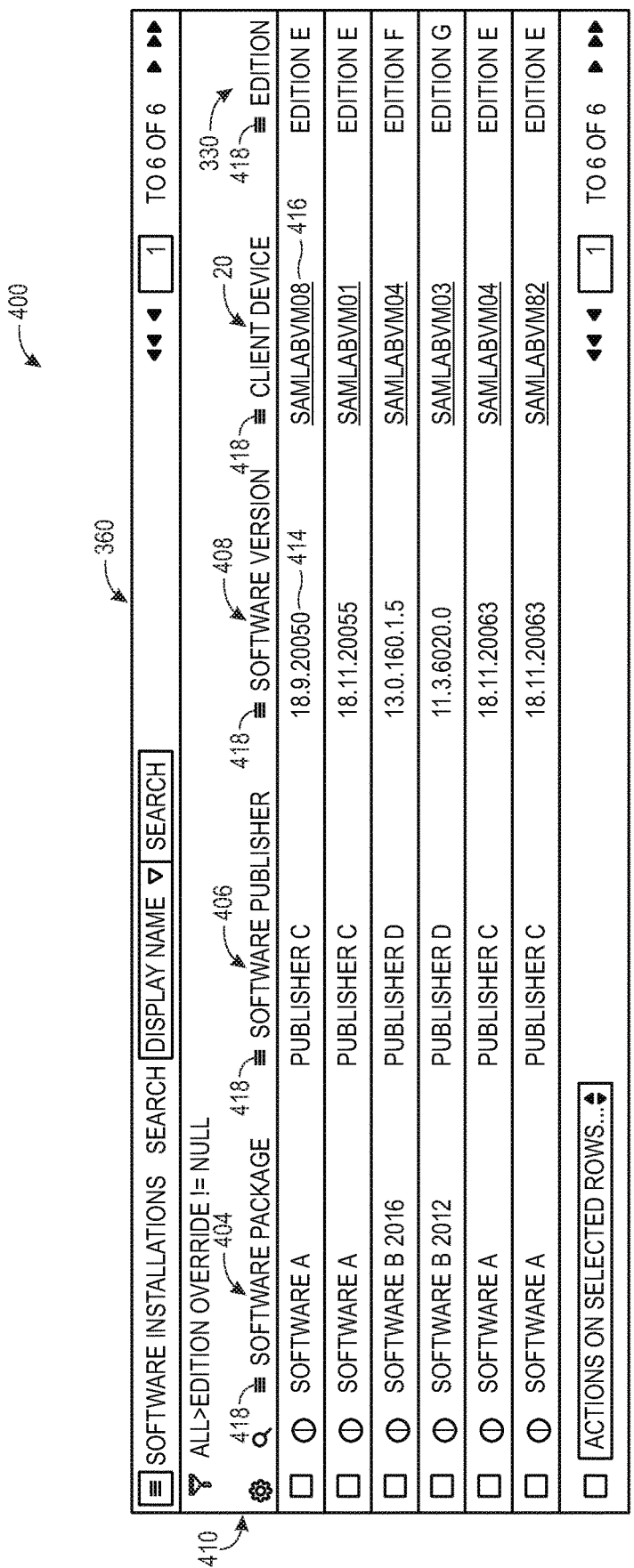
FIG. 6 is a screenshot of an embodiment of an edition report generated by an edition-managing software application, in accordance with aspects of the present disclosure.

To help illustrate steps and components of the process 320, FIG. 6 is a screenshot of an embodiment of a user interface 400 illustrating an example embodiment of the edition report 360 having edition information 330 for multiple client devices 20, in accordance with aspects of the present disclosure. In some embodiments, the user interface 400 is a screen that is displayed on a suitable client device 20 after execution of the edition-managing software application 322 to retrieve the edition information 330.

As shown, the edition report 360 of the present embodiment is a table of data that is organized with respect to columns of data including software package 404, software publisher 406, software version 408, client device 20, and edition information 330, each identified by a respective column identifier 410. The illustrated embodiment of the edition report 360 includes a column of data associated with each column identifier. For example, the software packages 404, which may be identified as target software packages within the edition-managing software application 322 of FIG. 5, include Software A, Software B 2012, and Software B 2016. Further, the software publisher 406 of Software A is Publisher C. Similarly, the software publisher 406 of Software B 2012 and Software B 2016 is Publisher D. In some embodiments, the edition-managing software application 322 retrieves version information indicative of the versions of the software packages 404 to populate the edition report 360 with identified versions of the software packages 404. For example, a row for each software package 404 includes a respective version identifier 414 that denotes a version of the software package 404, as well as a client device identifier 416 that denotes a client device 20 on which the software package 404 is installed. The edition information 330 for each software package 404 is also displayed in the edition report 360. For example, the currently installed edition of Software A on the client devices 20 is Edition E, while Software B 2016 is installed on one client device 20 in Edition F and Software B 2012 is installed on another client device 20 in Edition G.

The user interface 400 may include any suitable user-selectable items to enable modification, manipulation, or distribution of the edition report 360. For example, by selecting (e.g., providing input indicative of a user selection of) a sorting header item 418 adjacent to a respective column identifier 410, the edition report 360 may be reorganized to display a desired organization of the edition report 360. Similarly, selection of one of the sorting header items 418 may enable filtering of the displayed data to present a desired subset of the edition report 360, such as one that filters out software packages 404 published by Publisher D while displaying software packages 404 published by Publisher C.

Based on the accurate information displayed in the edition report 360, an enterprise may efficiently improve software license compliance for the software packages 404. In other words, if it is determined that two software licenses are purchased for Edition F corresponding to Software B 2016 and no software licenses are purchased for Edition G corresponding to Software B 2012, the enterprise may upgrade the installation of Software B 2012 to Software B 2016 to utilize the additional software license thereof. Alternatively, the enterprise may terminate the second license for edition F of Software B 2016 and purchase a software license for Edition G of Software B 2012. In some embodiments, the edition-managing software application 322 may analyze software license libraries (e.g., a current set of software licenses) of the enterprise (e.g., stored in one or more databases) in view of the actual installations of the software packages 404 to automatically identify mismatches and propose resolutions (e.g., purchasing or terminating software licenses, upgrading editions). In such embodiments, the edition-managing software application 322 may provide a notification or alert indicative of the identified mismatches and/or proposed resolutions. In these and similar manners, via the edition-managing software application 322, the enterprise may reduce under-licensing or over-licensing of the software packages 404 by closely aligning its software license library with actual installations of the software packages 404 on the client devices 20.

In addition to tracking installations of editions of software packages, the embodiments disclosed herein also enable the enterprise to monitor the usage of software packages installed on the client devices 20, thereby enabling distribution or allocation of software licenses to end-users that suitably use the software packages. Indeed, in some cases, upon determining via the edition-managing software application 322 of FIG. 5 that there are one or multiple installations of an edition of a software package for which the enterprise lacks a software license, the enterprise may desire to uninstall the software package from client devices of end-users that are not using the software program. As with the edition-managing software application 322 of FIG. 5, one or more software packages installed locally on client devices 20 and for which tracking is desirable may be selected as target software packages. Compared to previously-utilized software usage tracking techniques that may document each access and a duration of each access of certain software packages, the present techniques alternatively monitor a last used date or launch date of target software packages that enables effective and efficient tracking of software usage with significantly less data generation and data storage requirements.

Figure 7:
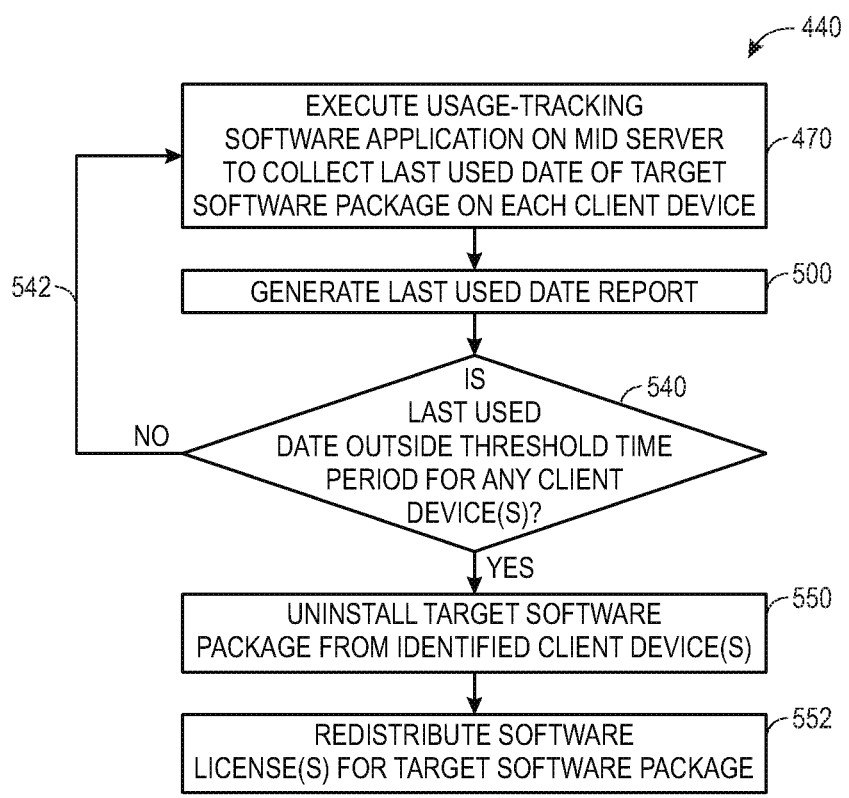
FIG. 7 is a flow diagram of an embodiment of a process for identifying and redistributing target software packages based on a last used date of the target software packages by end-users, in accordance with aspects of the present disclosure.

With the preceding in mind, FIG. 7 is a flow diagram of an embodiment of a process 440 for identifying and redistributing target software packages based on a last used date of the target software packages by end-users, in accordance with aspects of the present disclosure. The steps illustrated in the process 440 may be performed by a system management software program (e.g., the SCCM) that implements a usage-tracking software program, which may be implemented on a local server (e.g., the MID server 24) in communication with client devices 20 on the client network 12 (e.g., remote client network), or by other suitable devices on the cloud computing system 10. Furthermore, the steps illustrated in the process 440 are meant to facilitate discussion and are not intended to limit the scope of this disclosure, because additional steps may be performed, certain steps may be omitted, and the illustrated steps may be performed in any order. It is to be understood that the present techniques may be utilized to monitor usage of any suitable number of target software packages on any suitable number of client devices 20.

Certain initializing steps may be taken to enable performance of the process 440. For example, software metering features of the system management software program may be enabled for the client devices 20 for which software usage are to be monitored. However, in contrast to traditional software metering, the process 440 may be performed without implementing specialized or parameterized software metering rules for the software metering features. To implement the usage-tracking software program, the system management software program may be connected to a database of MID server 24, such as a Software Asset Management (SAM) database. With reference to FIG. 8, a screenshot of an embodiment of parameterizing a data source 450 (e.g., "SCCM 2012 V2 Usage-Tracking") of the system management software program implementing a usage-tracking software program 452 on a MID server 24 (e.g., "mid_on_27") is illustrated, in accordance with aspects of the present disclosure. In the present embodiment, the usage-tracking software program 452 is a Specific SQL (Structured Query Language) query that is implemented on a server 454 (e.g., "SAMLABM03"). To gain access to a database 456 (e.g., "CM_P02") of the server 454, credentials 460 may be provided to and verified by the data source 450.

Returning to the process 440 of FIG. 7, with access provided to the SAM database of the MID server 24, the system management software program may execute (block 470) the usage-tracking software program to collect a last used date of the target software package(s) on each client device 20. As used herein, the last used date is a record of the most recent launch of the target software package on the client device 20. In some embodiments, the last used date includes both a day and a time (e.g., datetime). As such, the usage-tracking software program generates a single record for each client device 20 and target software package thereon, in contrast to previous software metering techniques that provide full usage data by indexing and aggregating data from a plurality of recent accesses to software packages. By way of example, FIG. 9 is a screenshot of an embodiment of a database 480 (e.g., SAM database) stored on a local server (e.g., MID server 24) and populated with last used date information 484 for the target software packages, in accordance with aspects of the present disclosure. The usage-tracking software program of the present embodiment is executed to query the database 480 based on the ExplorerFileName( ) 486, although it is to be understood that other suitable identifiers such as a FileDescription( ) 490, Folderpath( ) 492, and so forth may be used in other embodiments.

Returning to FIG. 7, based on the last used date information 484, the system management software program may generate (block 500) a last used date report that details the most recent access of target software applications on client devices 20. Indeed, with reference now to FIG. 10, a screenshot of an embodiment of a user interface 510 displaying a last used date report 512 of target software packages 514 is illustrated, in accordance with aspects of the present disclosure. The last used date report 512 is organized with respect to users 520, client devices 20, software publishers 522, target software packages 514, and last used date 526. The last used date 526 is illustrated as showing both a date and a time at which a particular target software package 514 was last launched by a user on the client device 20. For example, user "sysadmin" last launched Software B on Apr. 4, 2018 at 22:31:10.

Returning again to process 440 of FIG. 7, with the last used date 526 retrieved for each target software package, the system management software program may determine (block 540) whether the last used date 526 is outside a threshold time period for any client devices 20. The threshold time period is set as any suitable interval outside of which a user may be considered to be underutilizing a particular target software package. As such, the threshold time period may be 30 days, 2 months, 6 months, 12 months, and so forth. By way of example, if the target software package is a particular high-cost 3-D modeling software package that is in high demand by end-users, the threshold time period may be set as 30 days to provide relatively fast turnover of the target software package. If the target software package is a seasonal software package that may be effectively utilized once a year, such as a tax software package, the threshold time period may be set as 14 months or 16 months to enable a full season to pass before potential disuse of the target software package is identified.

In response to determining that the last used date 526 is within the threshold time period for each client device 20, the system management software program may return to block 470 to execute the usage-tracking software program (e.g., after a wait interval, upon user request), as indicated by arrow 542. In some embodiments, the process 440 may terminate instead of returning to block 470. In response to determining that the last used date 526 is outside the threshold time period for one or multiple client devices 20, the system management software program may uninstall (block 550) the target software package from identified client devices 20. Then, the system management software program may redistribute (block 552) software licenses for the target software packages to other end-users who desire to install the target software packages, improving utilization of purchased assets of the enterprise. In some embodiments, one or more of blocks 540, 550, and 552 may alternatively be manually performed by a system administrator of the client network 12 or the cloud-based platform 16. In this manner, the system management software application may determine whether any users have not accessed target software packages within a time threshold based on the date of last use to enable a software license to the software to be revoked and redistributed to other users for improved software usage and improved software license management.

As discussed herein, software license management for an enterprise may be facilitated by multiple techniques and features. An edition-managing software application may be implemented on client devices or a local server to query registries of the client devices for edition information associated with a target software package. When retrieved, the edition information may then be stored in a universal storage location or WMI class entry, from which the edition-managing software application may efficiently generate an edition report. The edition report therefore provides an accurate representation of actual installations of each edition of the target software package on the client devices, thereby enabling the enterprise to acquire or maintain an appropriate number of software licenses for each installation.

As another illustration of software license management, a system management software program may implement a usage-tracking software program on a local server coupled to a number of client devices to retrieve a last used date of a target software package on each client device. If the last used date is beyond a threshold time period for a particular client device, the enterprise may accurately determine that the target software package is underutilized compared to a desired usage. Then, the target software package may be uninstalled from the particular client device and installed on another client device, while the software license thereto is similarly redistributed to the other client device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
monitoring, by a server device of a network, usage of a target software package installed on a plurality of client devices, wherein a respective installation of the target software package on each client device of the plurality of client devices is associated with a respective edition, wherein the respective edition is distinct from a version of the respective installation of the target software package, and wherein monitoring the usage of the target software package comprises:
querying, by the server device, a publisher-specified location in respective registries of the plurality of client devices in the network to retrieve edition information for the target software package, wherein the edition information is indicative of the respective editions of the respective installations of the target software package on each client device of the plurality of client devices, and wherein querying the publisher-specified location in the respective registries comprises transmitting respective commands to each software manager installed on the plurality of client devices to retrieve the edition information for the target software package from the publisher-specified location in the respective registries;
receiving, by the server device, the edition information for the target software package from each software manager installed on the plurality of client devices, wherein the edition information for the target software package comprises coded edition information;
storing, by the server device, the edition information in a Windows Management Instrumentation (WMI) class entry for the target software package;
converting, by the server device, the coded edition information for the target software package from each software manager into respective decoded edition identifiers; and
generating, by the server device, an edition report based on the edition information for the target software package, wherein the edition report comprises the respective decoded edition identifiers;
determining, by the server device, that a first edition of the respective editions of the target software package has one or more unused licenses based on a current set of licenses associated with the network; and
generating, by the server device, an alert indicative of a recommendation to upgrade a second edition of the respective editions of the target software package installed on one or more client devices of the plurality of client devices to the first edition.

2. The method of claim 1, wherein monitoring the usage of the target software package comprises:
determining, by the server device, whether the WMI class entry exists for the target software package; and
in response to determining that the WMI class entry does not exist, generating, by the server device, the WMI class entry for the target software package.

3. The method of claim 1, wherein monitoring the usage of the target software package comprises:
querying, by the server device, a different publisher-specified location in the respective registries of the plurality of client devices to retrieve edition information for a different target software package, wherein querying the different publisher-specified location in the respective registries comprises transmitting respective additional commands to each software manager installed on the plurality of client devices to retrieve the edition information for the different target software package from the different publisher-specified location in the respective registries;
receiving, by the server device, the edition information for the different target software package from each software manager installed on the plurality of client devices; and storing, by the server device, the edition information for the different target software package in a different Windows Management Instrumentation (WMI) class entry for the different target software package; and wherein the method comprises generating, by the server device, the edition report based on the edition information for the target software package and the edition information for the different target software package.

4. The method of claim 3, wherein the edition information for the target software package and the edition information for the different target software package are retrieved each software manager installed on the plurality of client devices in parallel.

5. The method of claim 3, comprising:
receiving input indicative of user selection of a user-selectable item of the edition report; and
reorganizing or filtering the edition report based on the user selection.

6. The method of claim 1, comprising:
receiving, from a database by the server device, data indicative of the current set of software licenses associated with the target software package.

7. The method of claim 1, wherein monitoring the usage of the target software package comprises:
querying, by the server device, the respective registries of the plurality of client devices to retrieve version information indicative of the respective versions of the respective installations of the target software package, wherein querying the respective registries comprises transmitting respective additional commands to each software manager installed on the plurality of client devices to retrieve the version information from the respective registries; and
receiving, by the server device, the version information for the target software package from each software manager installed on the plurality of client devices; and
wherein the method comprises generating, by the server device, the edition report based on the edition information and the version information, wherein the edition report is configured to display the respective editions of the respective installations of the target software package and the respective versions of the respective installations of the target software package.

8. The method of claim 1, comprising:
retrieving, by the server device, a last used date of the target software package from a local server communicatively coupled to the plurality of client devices;
determining whether the last used date is outside a threshold time period; and
in response to determining that the last used date is outside the threshold time period, providing, by the server device, an indication that the target software package is underutilized or not in use.

9. The method of claim 1, wherein querying the publisher-specified location in the respective registries of the plurality of respective client devices comprises implementing a structured query language (SQL) query against the respective registries of the plurality of client devices.

10. The method of claim 1, wherein the first edition of the target software package comprises one or more features that are not provided by the second edition of the target software package.

11. The method of claim 1, wherein the coded edition information comprises a combination of alpha numerals indicative of the respective edition of the target software package.

12. The method of claim 1, wherein storing the edition information in the WMI class entry for the target software package comprises:
determining whether a previous WMI class entry for the target software package exists;
overwriting existing edition information in the previous WMI class entry with the edition information in response to determining that the previous WMI class entry for the target software package exists; and
generating a new WMI class entry to store the edition information in response to determining that the previous WMI class entry for the target software package does not exist.

13. The method of claim 1, wherein the edition report comprises a list, a table, a database, or any combination thereof.

14. A system, comprising:
one or more data centers configured to host a client instance accessible by one or more remote client networks, wherein the one or more remote client networks comprise a plurality of client devices, wherein a respective installation of a target software package on each client device of the plurality of client devices is associated with a respective edition, wherein the respective edition is distinct from a version of the respective installation of the target software package, and wherein the one or more data centers comprise one or more processors configured to employ an edition-managing software application to perform operations comprising:
monitoring usage of a target software package installed on the plurality of client devices, wherein monitoring the usage of the target software package comprises:
querying a publisher-specified location in respective registries of the plurality of client devices to retrieve edition information for the target software package, wherein the edition information is indicative of the respective editions of the respective installations of the target software package on each client device of the plurality of client devices, and wherein querying the publisher-specified location in the respective registries comprises transmitting respective commands to each software manager installed on the plurality of client devices to retrieve the edition information for the target software package from the publisher-specified location in the respective registries;
receiving the edition information for the target software package from each software manager installed on the plurality of client devices, wherein the edition information for the target software package comprises coded edition information;
storing the edition information in a respective registry entry of the respective registries of the plurality of client devices;
converting the coded edition information for the target software package from each software manager into respective decoded edition identifiers; and
generating an edition report based on the edition information for the target software package, wherein the edition report comprises the respective decoded edition identifiers;
determining that a first edition of the respective editions of the target software package is under-licensed based on a current set of licenses associated with the network; and generating an alert indicative of a recommendation to uninstall the first edition of the target software package on one or more client devices of the plurality of client devices and install a second edition of the respective editions of the target software package on one or more client devices of the plurality of client devices.

15. The system of claim 14, wherein the edition report is configured to display the edition information for the target software package.

16. The system of claim 14, wherein monitoring the usage of the target software package comprises:
determining whether the respective registry entry of the respective registries exists for the target software package in the plurality of client devices; and
in response to determining that the respective registry entry does not exist for the target software package in the plurality of client devices, generating the respective registry entry for the target software package in at least one of the plurality of client devices.

17. The system of claim 14, wherein the operations comprise generating the edition report based on the edition information on a scheduled or periodic basis.

18. The system of claim 14, wherein the operations comprise:
retrieving a last used date of the target software package from a local server communicatively coupled to the plurality of client devices;
determining whether the last used date is outside a threshold time period; and
in response to determining that the last used date is outside the threshold time period, providing an indication that the target software package is underutilized or not in use.

19. The system of claim 14, wherein the coded edition information comprises a combination of alpha numerals indicative of the respective edition of the target software package.

20. A non-transitory, computer-readable medium, comprising machine-readable instructions, that when executed by one or more processors, cause the one or more processors to:
monitor, by a server device of a network, usage of a target software package installed on a plurality of client devices, wherein a respective installation of the target software package on each client device of the plurality of client devices is associated with a respective edition, wherein the respective edition is distinct from a version of the respective installation of the target software package, and wherein monitoring the usage of the target software package comprises:
querying, by the server device, a publisher-specified location in respective registries of the plurality of client devices in the network to retrieve edition information for the target software package, wherein the edition information is indicative of the respective editions of the respective installations of the target software package on each client device of the plurality of client devices, and wherein querying the publisher-specified location in the respective registries comprises transmitting respective commands to each software manager installed on the plurality of client devices to retrieve the edition information for the target software package from the publisher-specified location in the respective registries;
receiving, by the server device, the edition information for the target software package from each software manager installed on the plurality of client devices, wherein the edition information for the target software package comprises coded edition information;
converting, by the server device, the coded edition information for the target software package from each software manager into respective decoded edition identifiers;
generating, by the server device, an edition report based on the edition information for the target software package, wherein the edition report comprises the respective decoded edition identifiers; and
storing, by the server device, the edition information in a Windows Management Instrumentation (WMI) class entry for the target software package;
determine, by the server device, that a first edition of the respective editions of the target software package has one or more unused licenses based on a current set of licenses associated with the network; and
generate, by the server device, an alert indicative of a recommendation to upgrade a second edition of the respective editions of the target software package installed on one or more client devices of the plurality of client devices to the first edition.

* * * * *